United States Patent
Pal et al.

(10) Patent No.: US 9,584,470 B2
(45) Date of Patent: Feb. 28, 2017

(54) DYNAMIC DHCP FOR WI-FI CONNECTIVITY IN A VEHICLE

(71) Applicants: General Motors LLC, Detroit, MI (US); GM Global Technology Operations LLC, Detroit, MI (US)

(72) Inventors: Dipankar Pal, Sylvania, OH (US); Muhammad Fahad Alam, Macomb, MI (US); Ronald Terry, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 225 days.

(21) Appl. No.: 14/175,717

(22) Filed: Feb. 7, 2014

(65) Prior Publication Data

US 2015/0229604 A1 Aug. 13, 2015

(51) Int. Cl.
| | |
|---|---|
| *H04L 12/28* | (2006.01) |
| *H04L 29/12* | (2006.01) |
| *H04W 4/00* | (2009.01) |
| *H04W 76/02* | (2009.01) |

(52) U.S. Cl.
CPC ...... *H04L 61/2053* (2013.01); *H04L 61/2007* (2013.01); *H04L 61/2038* (2013.01); *H04W 4/008* (2013.01); *H04W 76/02* (2013.01); *H04L 61/2015* (2013.01)

(58) Field of Classification Search
USPC ......... 370/252, 349, 389, 392, 395.2, 395.3, 370/471, 474, 475
See application file for complete search history.

(56) References Cited

U.S. PATENT DOCUMENTS

| | | | | |
|---|---|---|---|---|
| 7,099,338 | B1* | 8/2006 | Lee | H04L 29/12009 370/401 |
| 7,810,137 | B1* | 10/2010 | Harvey | H04L 63/102 726/18 |
| 8,887,237 | B2* | 11/2014 | Janakiraman | H04L 12/4641 713/150 |
| 2002/0138614 | A1* | 9/2002 | Hall | H04L 29/12009 709/225 |
| 2002/0147019 | A1* | 10/2002 | Uhlik | H04W 76/045 455/452.1 |
| 2006/0047835 | A1* | 3/2006 | Greaux | G06Q 20/12 709/229 |
| 2006/0114894 | A1* | 6/2006 | Cherchali | H04L 29/12216 370/389 |
| 2008/0008197 | A1* | 1/2008 | Sakanashi | H04L 61/2015 370/401 |

(Continued)

*Primary Examiner* — Kwang B Yao
*Assistant Examiner* — Nguyen Ngo
(74) *Attorney, Agent, or Firm* — Christopher DeVries; Reising Ethington P.C.

(57) ABSTRACT

A system and a method using the system for wireless communication using a vehicle telematics unit, including the steps of: prior to a vehicle telematics unit establishing a network connection, assigning a temporary internet protocol (IP) address having a short-term lease duration to a mobile device to permit communication between the telematics unit and the mobile device; and if the network connection is not established prior to the expiration of the short-term lease duration, renewing the temporary IP address, wherein the renewal lease duration is shorter than the earlier lease duration.

12 Claims, 2 Drawing Sheets (56) References Cited

U.S. PATENT DOCUMENTS

| | | | | |
|---|---|---|---|---|
| 2008/0189764 | A1* | 8/2008 | Gronholm | G06F 15/16 726/3 |
| 2011/0167460 | A1* | 7/2011 | Tranchina | B60N 2/4876 725/75 |
| 2011/0173678 | A1* | 7/2011 | Kaippallimalil | G06F 21/31 726/4 |
| 2011/0281562 | A1* | 11/2011 | Videtich | H04W 4/046 455/414.1 |
| 2012/0142367 | A1* | 6/2012 | Przybylski | H04W 4/046 455/456.1 |
| 2012/0162891 | A1* | 6/2012 | Tranchina | B60R 11/0252 361/679.26 |
| 2012/0198080 | A1* | 8/2012 | Yang | H04L 61/2015 709/227 |
| 2013/0046899 | A1* | 2/2013 | Harrington | H04L 61/6086 709/230 |
| 2013/0080614 | A1* | 3/2013 | Iyer | H04L 61/2053 709/223 |
| 2013/0184000 | A1* | 7/2013 | Cook | H04W 4/023 455/456.1 |
| 2013/0304281 | A1* | 11/2013 | Burcham | G06F 21/10 701/2 |
| 2013/0337801 | A1* | 12/2013 | Yi | H04W 80/10 455/426.1 |
| 2014/0079217 | A1* | 3/2014 | Bai | H04L 63/0869 380/270 |
| 2014/0309806 | A1* | 10/2014 | Ricci | B60Q 1/00 701/1 |
| 2014/0328248 | A1* | 11/2014 | Greubel | H04W 8/005 370/328 |

* cited by examiner

DYNAMIC DHCP FOR WI-FI CONNECTIVITY IN A VEHICLE

TECHNICAL FIELD

The present invention relates to assigning a temporary internet protocol (IP) address to a client device by a vehicle telematics unit host to enable Wi-Fi connectivity. More particularly, the invention relates to regulating lease durations of the assigned IP addresses.

BACKGROUND

Dynamic Host Configuration Protocol (DHCP) is a networking protocol that may be used to configure client devices that wish to be connected to the network so that the devices can communicate using an internet protocol address (or IP address). The client devices may request configuration data from the host server; this data includes an IP address, a default route, and one or more domain name system (DNS) server addresses.

SUMMARY

According to an embodiment of the invention, there is provided a method of wireless communication using a vehicle telematics unit, including the steps of: prior to a vehicle telematics unit establishing a network connection, assigning a temporary internet protocol (IP) address having a short-term lease duration to a mobile device to permit communication between the telematics unit and the mobile device; and if the network connection is not established prior to the expiration of the short-term lease duration, renewing the temporary IP address, wherein the renewal lease duration is shorter than the earlier lease duration.

According to another embodiment of the invention, there is provided a method of wireless communication using a vehicle telematics unit, including the steps of: assigning a temporary internet protocol (IP) address having a short-term lease duration to a mobile device to permit communication between a telematics unit and the mobile device; establishing a network connection between the telematics unit and a wireless service provider (WSP); and renewing the temporary IP address with a long-term lease duration.

According to another embodiment of the invention, there is provided a method of wireless communication using a vehicle telematics unit, including the steps of: (a) initiating at the vehicle telematics unit a network connection with a wireless service provider (WSP); (b) assigning via short range wireless communication (SRWC) a temporary internet protocol (IP) address having a lease duration to a mobile device located at a vehicle; (c) allowing communication between the telematics unit and the mobile device via SRWC; (d) renewing the temporary IP address with the mobile device, wherein the lease duration of the renewed IP address is shorter than the prior lease duration; (e) repeating step (d) until the network connection is established with the WSP; and (f) renewing the temporary IP address for an extended lease duration after the telematics unit establishes the network connection, wherein the extended lease duration is greater than the original lease duration.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below pertains to establishing communication between a vehicle telematics unit and a mobile device in or near a vehicle during a period of time when the telematics unit is attempting to make a connection with a wireless carrier system (and/or a wireless service provider (WSP) utilizing that carrier system); e.g., at the time of vehicle start up. During this period of time, a user of the mobile device may receive an error suggesting the inability of the telematics unit and mobile device to connect. For example, the user of the mobile device may attempt to connect the mobile device to the telematics unit using a Wi-Fi hotspot service (i.e., provided by the telematics unit). As the telematics unit attempts to establish the network or WSP connection, it may not establish immediately the Wi-Fi connection with the mobile device. Thus, the mobile device may display a notification suggesting a malfunction at the telematics unit (e.g., pertaining to Wi-Fi hotspot connectability). The methods described below enable the mobile device to connect with the telematics unit via short range wireless communication and receive locally stored data prior to the establishment of the network connection. And then the mobile device may transition to another mode after the network connection has been established enabling the mobile device to access the data from the WSP using the telematics unit's Wi-Fi hotspot functionality.

The description of the method follows a description of one example of a communication system that includes the vehicle telematics unit and the mobile device.

Communications System—

Figure 1:
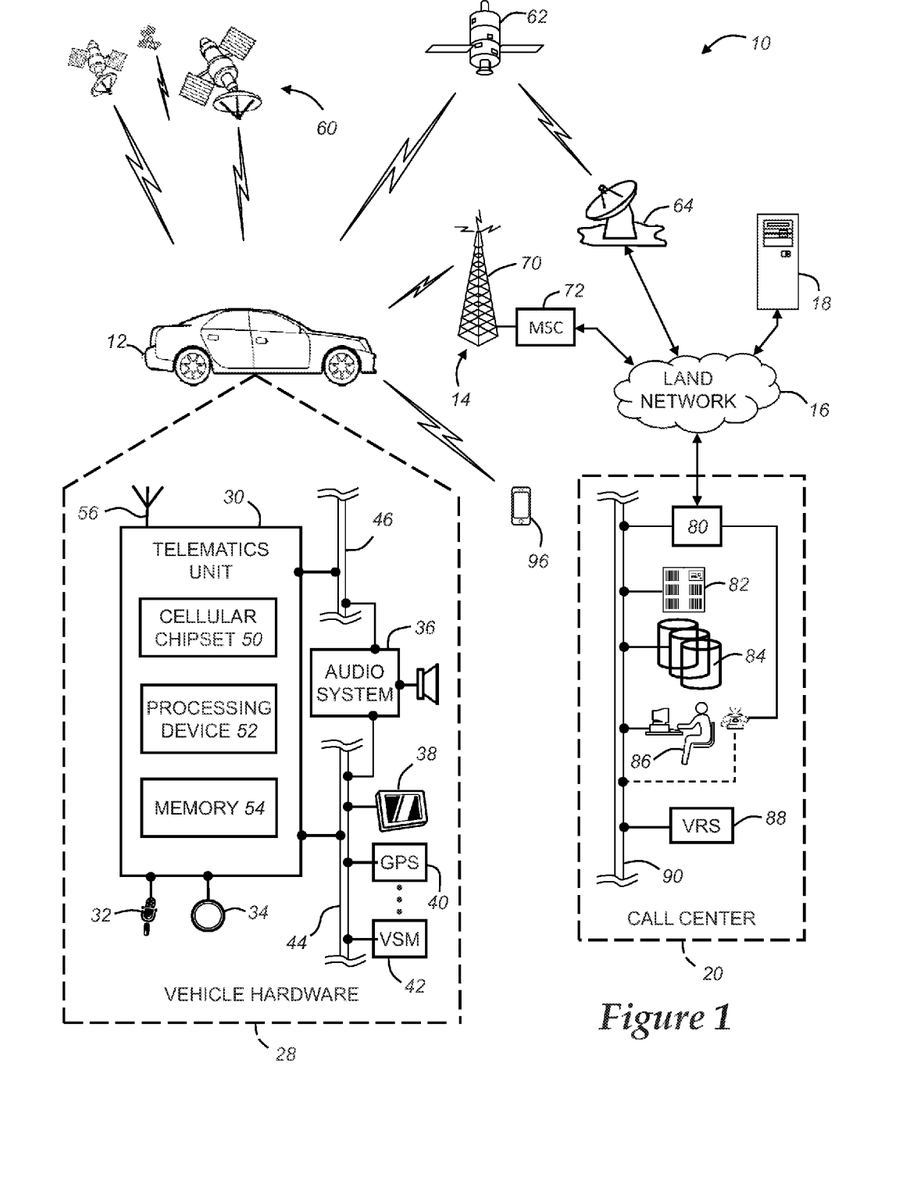
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 96) can also be carried out using telematics unit 30.

For this purpose, telematics unit 30 can be configured to communicate wirelessly according to one or more suitable wireless protocols (e.g., WiMAX, ZigBee™, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server. In addition, in some implementations, the telematics unit 30 may be configured to have an internet protocol (IP) stack of which a Dynamic Host Configuration Protocol (DHCP) server is one component—which may perform the logic and management for dynamic IP assignment and subnet masking.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules: and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions: or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 96. The mobile device may be an electronic device which may be used to make mobile telephone calls across a wide geographic area where transmissions are facilitated by the wireless carrier system 14 (i.e., when the mobile device is connected to the wireless carrier system), and/or it may be a device capable of SRWC.

The mobile device may further include: hardware, software, and/or firmware enabling cellular telecommunications and/or communications via short-range wireless communication (e.g., Wi-Fi Direct and Bluetooth) as well as other mobile device applications. Such mobile device applications may include software applications, which may be preinstalled or installed by the user (or manufacturer) (e.g., having a graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The hardware of the mobile device 96 may comprise: a display, a keypad (e.g., push button and/or touch screen), a microphone, one or more speakers, motion-detection sensors (such as accelerometers, gyroscopes, etc.), and a camera. In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 96 include a cellular telephone, a personal digital assistant (PDA), a Smart Phone, a personal laptop computer or tablet computer having two-way communication capabilities, a netbook computer, or any suitable combinations thereof. The mobile device 96 at the vehicle may be inside or outside of vehicle 12, and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile device 96 and the vehicle 12 may be used together by a person known as the vehicle user such as a driver or a passenger. However, the vehicle user does not need to be the driver or a passenger nor does the vehicle user need to have ownership of the mobile device 96 or the vehicle 12. For example, the vehicle user may be an owner or a licensee of either or both; or for example, the user may be any person using their mobile device wirelessly coupled to the telematics unit via SRWC.

Method—

The telematics unit 30 and the mobile device 96 may communicate with one another according to one or more methods in the operating environment just described. More specifically, in at least one implementation, the telematics unit may operate as a Wi-Fi hotspot for the mobile device; e.g., enabling data communication between the mobile device and remote servers, the call center 20, etc., e.g., via cellular transmission, the internet, etc. To facilitate this communication, the telematics unit 30 may assign a temporary or dynamic internet protocol (IP) address to the mobile device 96 (e.g., according to a DHCP) prior to the telematics unit establishing a network connection with a wireless service provider (WSP) via the one or more wireless carrier systems 14. The assigned IP address may be coupled with other IP configuration data including an associated short or short-term or first lease duration (ds). In one example, the length of the first lease duration may be approximately the length of time generally required to establish a network connection between the WSP and the telematics unit 30. As will be appreciated by those skilled in the art, during this first lease duration, the mobile device 96 may be unable access the cellular network via the Wi-Fi hotspot. More specifically, the mobile device 96 may not access the cellular network until the first lease duration expires and a new lease is provided. However, during the first lease duration, the mobile device 96 may access locally stored data via the telematics unit; e.g., data stored in memory 54. Furthermore, by assigning a temporary IP address to the mobile device 96 during this first lease duration, the user may not receive any indication of an error due to a lack of cellular network connectivity or connection: thus, user confusion may be avoided.

If at the time the first lease expires the network connection between the telematics unit and the WSP has been established, then the temporary IP address may be renewed having new IP configuration data including a lease duration (de) that is generally longer or extended in length (e.g., a long-term lease duration). During the extended duration, the mobile device may utilize the telematics unit as a Wi-Fi hotspot.

However when the duration of the first lease expires, if the network connection between the telematics unit 30 and the WSP has not been established, then the temporary IP address may be renewed having a second lease duration that is shorter than the first lease duration. As will be described in greater detail below, this process may be continually repeated until the network connection is established; e.g., a renewal of the IP address with a third lease duration shorter than the second, a renewal of the IP address with a fourth lease duration shorter than the third, etc. Eventually, the network connection between the telematics unit and the WSP and/or carrier system 14 may occur. Upon the expiration of the latest lease duration, the temporary IP address may be renewed having new IP configuration data including the long or extended lease duration. In one example, the length of the extended lease duration may be approximately 24 hours. If necessary, the extended lease duration may be renewed also. And during this duration (and any renewals that may follow), the mobile device 96 may utilize the telematics unit as a Wi-Fi hotspot (i.e., using the internet, transmitted data cellular, etc.) provided the unit 30 remains connected to the network, e.g., as previously described.

Figure 2:
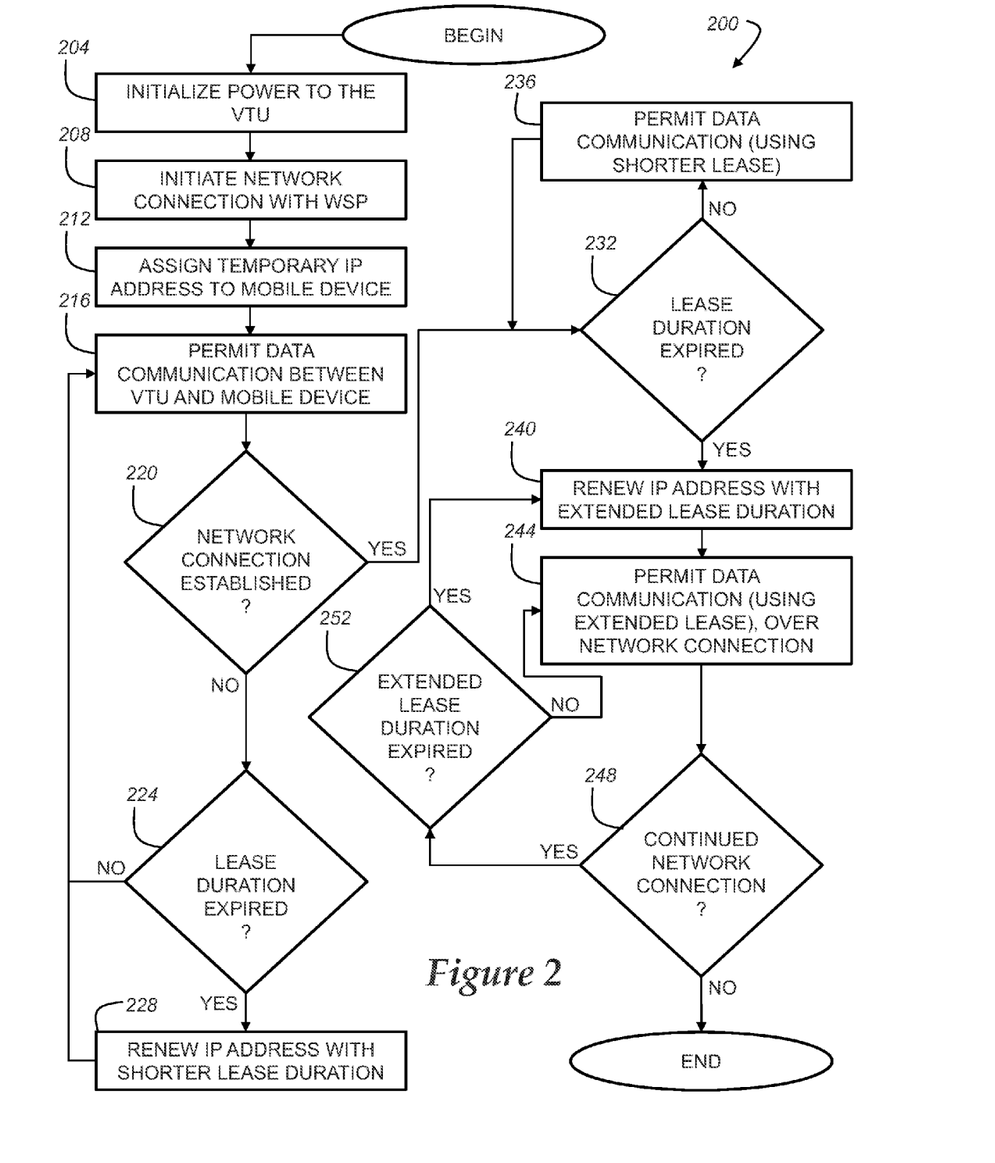
FIG. 2 is a flow chart illustrating one example of a method of wireless communication using a vehicle telematics unit.

Turning now to FIG. 2, there is shown a flow chart illustrating one example of a method 200 of wireless communication using the vehicle telematics unit 30. Where appropriate, this method of communication between the telematics unit 30 and the mobile device 96 may be carried out using SRWC. The method begins at step 204 where the telematics unit 30 is initialized or powered up. This may occur at the time of vehicle ignition or at any other suitable time. After step 204, the method may proceed to step 208. And in some implementations, the method 200 may begin at step 208 instead of step 204—e.g., the method 200 may begin at step 208 following a network connection failure (i.e., the telematics unit and the wireless carrier system 14 become disconnected for reasons which will be apparent to those skilled in the art).

At step 208, the telematics unit 30 may initiate a network connection with the wireless carrier system 14 and/or a WSP. As previously described, this initiation may be a reconnection effort or a first attempt to connect (e.g., following a power boot-up of the telematics unit). After step 208, the method may proceed to step 212.

At step 212, the telematics unit may assign a temporary IP address to the mobile device; thus, the mobile device 96 may be configured as a client of the host telematics unit 30. The assignment may include suitable IP configuration data including an IP address, routing information, DNS server data, and a first lease duration ($ds_1$). The duration of the first lease may vary. In at least one embodiment, the first lease duration may be 45 seconds; in another embodiment, the first lease duration may be 60 seconds.

In some instances, step 208 may be performed before step 212. Regardless, after step 212, the method may proceed to step 216.

In step 216, data may be permitted to be transmitted between the vehicle telematics unit 30 and the mobile device 96. This data may include various host/client communication or protocol data, entertainment and/or infotainment data stored at the vehicle (e.g., in memory 54), etc., just to name a couple of examples. And in some circumstances, no data may be communicated therebetween. After step 216, the method may proceed to step 220.

In step 220, the telematics unit 30 may determine whether a cellular network connection has been established. Procedures and protocols for determining the existence of the network connection at the telematics unit are known to skilled artisans. In at least one implementation, the network connection will be determined to be established only if the telematics unit is fully ready (or operable) to act as a Wi-Fi hotspot at the time of the determination. If the network connection has been established (e.g., during the first lease duration), then the method 200 may proceed to step 232; however, if it has not been established, the method may proceed to step 224.

In step 224, the telematics unit may determine whether the first lease duration ($ds_1$) has expired. If it has expired, then the method 200 may proceed to step 228. However, if it has not expired, the method 200 may return and repeat steps 216, 220, and sometimes step 224.

When the method proceeds to step 228 (because the IP address expired; i.e., the associated first lease duration ($ds_1$) expired), the telematics unit may renew the IP address with a new lease duration ($ds_2$). In at least some embodiments, the new lease duration ($ds_2$) may be for a shorter duration than the previous duration ($ds_1$). For example, the shorter duration may be a predetermined value. For example, where the first lease duration ($ds_1$) is 60 seconds, the shorter lease duration ($ds_2$) may be 50 seconds. Once the IP address has been renewed with the new lease duration ($ds_2$), the method 200 may return and repeat steps 216, 220, and sometimes step 224. Thus, if steps 216, 220, 224, and 228 are repeated again, the next shorter lease duration ($ds_3$) may be 40 seconds. And additional next shorter lease durations are also possible ($ds_4$, $ds_5$, $ds_6$, etc.). Of course, this is merely an example; other suitable predetermined values may be used.

In another embodiment of step 228, the new lease duration may be a determined or calculated value. For example, the new lease duration ($ds_2$) may be 90% of the expired first lease duration ($ds_1$) (e.g., $0.90 \cdot d_1$). Thus, if the expired lease duration ($ds_1$) is 60 seconds, the next lease duration ($ds_2$) may be 54 seconds. In another example, the new lease duration ($ds_2$) may be based on the responsiveness or speed of the network (e.g., taking network traffic, congestion, etc. into account). Thus, if the network speed is sufficiently fast, the multiplier may be 50% (e.g., instead of 90%). These of course are merely examples; other implementations are possible. As previously discussed, the method may proceed from step 228 to repeat steps 216 and 220, and sometimes step 224 and/or step 228 (e.g., determining additional lease durations $ds_3$, $ds_4$, etc.).

Where both steps 220 and 224 are repeated, it should be appreciated that the lease durations may be continually shortened—the first lease duration ($ds_1$) being longer than the second lease duration ($ds_2$), the second lease duration ($ds_2$) being longer than the third ($ds_3$), etc. Shortening the duration of each respective lease renewal makes it more likely the mobile device 96 will have Wi-Fi connectivity at the soonest possible time. To illustrate, assume that for example $ds_1$ equals 60 seconds and that the method 200 reaches step 228, renewing the IP address with the lease duration $ds_2$ of another 60 seconds. If the telematics unit 30 used a total of 65 seconds to establish the cellular network connection, the mobile device would need to wait another 55 seconds before the current lease duration ($ds_2$) expired. Therefore, shortening the lease duration of each respective lease renewal may minimize any delay in Wi-Fi connectivity.

When the cellular network connection is determined to be established in step 220, the method proceeds to step 232. Step 232 may be similar to step 224. The telematics unit 30 determines whether the short lease duration (e.g., $ds_1$, $ds_2$, $ds_3$, etc.) has expired. If it has not expired, the method may proceed to step 236; if it has expired, the method may proceed to step 240.

In step 236 may be similar to step 216. Here, the mobile device is not yet able to utilize the telematics unit as Wi-Fi hotspot; however, as previously described, locally stored data may be transmitted between the vehicle telematics unit 30 and the mobile device 96. After step 236, the method may proceed to step 232 again; this loop may persist until the expiration of the short lease duration of the IP address.

In step 240, the IP address may be renewed again; however unlike the renewal in step 228, the renewal of the IP address in step 240 may have a first extended or longer lease duration ($de_1$). For example, in at least one embodiment, the extended lease duration ($de_1$) is 24 hours. The renewal in step 240 also may include providing other IP configuration data including routing information and DNS server data. After step 240, the method may proceed to step 244.

In step 244, for the first time, the mobile device 96 may utilize the telematics unit 30 as a Wi-Fi hotspot; i.e., the mobile device may be permitted to receive data over the cellular network connection previously established by the telematics unit. Thus in step 244, the telematics unit may provide various infotainment and/or entertainment data via SRWC including but not limited to audio files (e.g., MP3 files or audio books), video files, image files, other media or communication or entertainment files (e.g., messages such as chat, e-mail, text, etc.), software applications (e.g., audio, video, entertainment, utility, etc.), vehicle or driver information (e.g., insurance information (e.g., including electronic proofs), registration, driver's license (e.g., electronic copy)), technical manuals, maintenance information (e.g., changing tires, tire pressure, replacing wipers or interior/exterior vehicle lighting, checking fluid levels, changing filters (oil, air, etc.), maintenance updates), trip itineraries, map data or files, entertainment establishment information (e.g., such as menus, reservations, etc.), electronic advertisements, electronic coupons or discounts, electronic emergency information (emergency contact (e.g., on the log screen), first aid guide(s), other various emergency phone numbers, etc.), and any other electronic information that the vehicle users and/or occupants may wish to have access. This list is merely illustrative; the receipt of other data at the mobile device is possible also. After step 244, the method may proceed to step 248.

In step 248, the method may determine whether a continued cellular network connection exists. If the network connection has failed, the method 200 may end. The failure of the network connection may occur, e.g., when the vehicle 12 and/or telematics unit 30 is powered off due or due to issues or complications within the communication system 10 that will be appreciated by skilled artisans. It should be appreciated that in some embodiments, step 248 may interrupt step 244 (i.e., interrupt the transfer of data to the mobile device 96). Where step 248 determines a continued cellular network connection, the method may proceed to step 252.

In step 252, the method 200 may determine whether the duration of the extended lease duration ($de_1$) of the IP address has expired (e.g., similar to the determinations made in steps 224 and 232). If this lease has expired, the method 200 may proceed to renew it again in step 240. In at least one embodiment, the extended lease duration ($de_2$)—of the renewed IP address—is the same as the first extended lease duration ($de_1$); i.e., $de_1=de_2=24$ hours.

And if the extended lease duration ($de_1$) has not expired, the method may proceed to step 244, permitting the telematics unit to continue to serve as the Wi-Fi hotspot for the mobile device 96. Thus, steps 240, 244, 248, and 252 may be repeated multiple times.

The method 200 may be implemented with multiple mobile devices 96. For example, each mobile device may receive a temporary IP address and each may have a short-term duration associated therewith. Further, each short-term duration may be renew-able. And further still, when the telematics unit 30 establishes connectivity with the cellular network, each mobile device may be eventually renewed with an extended lease duration.

Thus there has been described various embodiments of a method of establishing wireless communication between a vehicle telematics unit and a mobile device in proximity of the vehicle. The telematics unit may initiate a cellular network connection, and prior to establishing that connection initiate short range wireless communication with the mobile device via a dynamic host configuration protocol (DHCP). The telematics unit and mobile device may be temporarily wirelessly coupled according to an IP address and an associated lease duration. If the lease duration expires prior to the establishment of the cellular network connection, the lease duration may be renewed, and the renewal may have a shorter duration than the previously expired lease. Once the cellular network connection is established and the temporary IP address expires (or expires again), the IP address may be renewed with an extended lease duration allowing the mobile device to access the cellular network using the telematics unit as a Wi-Fi hotspot. These transactions generally may be transparent to the user of the mobile device. More specifically, the user may perceive the mobile device connecting to the telematics unit and may not receive an error message indicating an absence or lack of Wi-Fi connectivity during the period of time that the telematics unit is establishing the cellular network connection.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of wireless communication using a vehicle telematics unit, comprising the steps of:
   (a1) attempting at the vehicle telematics unit to establish a cellular connection with a wireless carrier system;
   (a2) assigning an internet protocol (IP) address to a mobile device via a short range wireless communication (SRWC) link, wherein the IP address has a lease of a first short-term duration; and
   (b) when, following steps (a1) and (a2), the telematics unit has not established the cellular connection at an expiration of the lease, then renewing the lease based on an absence of an established cellular connection between the telematics unit and the wireless carrier system, wherein the renewed lease has a second short-term duration which is shorter than the first short-term duration.

2. The method of claim 1, wherein the telematics unit attempts to establish the cellular connection at a time of vehicle power-up or following a cellular connection failure.

3. The method of claim 1, wherein the mobile device is located at the vehicle.

4. The method of claim 1, wherein the mobile device is one of a cellular telephone, a personal digital assistant (PDA), a Smart Phone, a personal laptop computer or tablet computer having two-way communication capabilities, or a netbook computer.

5. The method of claim 1, further comprising: assigning unique IP addresses to a plurality of mobile devices, wherein each IP address has a lease of first short-term duration, wherein, when the telematics unit has not established the cellular connection at an expiration of the leases, each of the leases are renewed, wherein each of the renewed leases have a second short-term duration that is shorter than the first short-term durations.

6. The method of claim 1, further comprising: (c) repeating step (b) until the cellular connection is established, wherein a renewal duration of each consecutive lease is shorter than a previous duration of the respective lease.

7. The method of claim 1, further comprising: (c) when the cellular connection is established between the telematics unit and the wireless carrier system, then renewing the lease with the mobile device, wherein the renewed lease has an extended duration that is longer than the first short-term duration.

8. The method of claim 1, wherein, when the cellular connection is established between the telematics unit and the wireless carrier system, providing Wi-Fi hotspot service to the mobile device, wherein the Wi-Fi hotspot service is provided by the telematics unit via the SRWC link.

9. The method of claim 7, wherein the leases which have the first short-term duration, the second short-term duration, and the extended duration are according to a Dynamic Host Configuration Protocol (DHCP).

10. A method of wireless communication using a vehicle telematics unit, comprising the steps of:
   attempting to establish a cellular connection between a vehicle telematics unit and a wireless carrier system;
   assigning an internet protocol (IP) address to a mobile device via a short range wireless communication (SRWC) link, wherein the IP address has a lease of a first short-term duration;
   following the attempting and assigning steps, when the telematics unit has not established the cellular connection at an expiration of the lease, then renewing the lease associated with the IP address based on an absence of an established cellular connection between the telematics unit and the wireless carrier system, wherein the renewed lease has a second short-term duration which is shorter than the first short-term duration;
   after renewing the lease, then establishing the cellular connection between the telematics unit and the wireless carrier system;
   in response to the establishing the cellular connection, again renewing the lease associated with the IP address, wherein, after the established cellular connection, the again renewed lease has an extended duration that is longer than the first short-term duration; and then
   in response to renewing the lease having the extended duration, providing Wi-Fi hotspot service to the mobile device during the lease having the extended duration, wherein the Wi-Fi hotspot service is provided via the SRWC link between the telematics unit and the mobile device.

11. The method of claim 10, further comprising: when the lease having the extended duration expires, then renewing the lease having the extended duration.

12. A method of wireless communication using a vehicle telematics unit, comprising the steps of:
   (a) initiating at the vehicle telematics unit a cellular connection with a wireless carrier system based on a subscription agreement with a wireless service provider (WSP);
   (b) assigning at the telematics unit an internet protocol (IP) address to a mobile device located at a vehicle, wherein the assignment is via a short range wireless communication (SRWC) link, wherein the assignment has a lease of a first short-term duration;
   (c) following steps (a) and (b) and prior to the establishment of the cellular connection between the telematics unit and the wireless carrier system, providing content data to the mobile device via the SRWC link, wherein the content data is stored at the vehicle;
   (d) renewing the lease associated with the IP address based on an absence of an established cellular connection between the telematics unit and the wireless carrier system, wherein the renewed lease has a second short-term duration which is shorter than the first short-term duration;
   (e) following steps (a)-(d), establishing the cellular connection between the telematics unit and the wireless carrier system; and then
   (f) providing Wi-Fi hotspot service at the telematics unit, wherein the Wi-Fi hotspot service is provided via the SRWC link to the mobile device using another renewed lease, wherein the another renewed lease is for an extended duration that is longer than the first short-term duration.

* * * * *